US010305729B2

(12) United States Patent
Guo et al.

(10) Patent No.: US 10,305,729 B2
(45) Date of Patent: May 28, 2019

(54) SYSTEMS AND METHODS OF PROVIDING AN EDGE CLOUD STORAGE AND CACHING SYSTEM OPERATING OVER A LOCAL AREA NETWORK

(71) Applicant: Alcatel-Lucent USA Inc., Murray Hill, NJ (US)

(72) Inventors: Katherine Guo, Scotch Plains, NJ (US); Krishan Sabnani, Westfield, NJ (US); Arun Netravali, Westfield, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 209 days.

(21) Appl. No.: 15/255,666

(22) Filed: Sep. 2, 2016

(65) Prior Publication Data

US 2018/0069751 A1 Mar. 8, 2018

(51) Int. Cl.
| | |
|---|---|
| *G06F 15/16* | (2006.01) |
| *H04L 12/24* | (2006.01) |
| *H04L 29/08* | (2006.01) |
| *G06F 17/30* | (2006.01) |

(52) U.S. Cl.
CPC .... *H04L 41/0803* (2013.01); *G06F 17/30097* (2013.01); *H04L 67/2842* (2013.01); *H04L 41/12* (2013.01); *H04L 67/1097* (2013.01); *H04L 67/145* (2013.01)

(58) Field of Classification Search
CPC .............. H04L 67/104; H04L 67/1093; H04L 67/1063; H04L 67/107; H04L 41/042; H04L 41/0816; H04L 43/50; H04L 67/145; H04L 67/1046; H04L 67/1065; H04L 67/16; H04L 67/1076; H04L 41/0886; H04L 67/04; H04L 67/1068; H04L 67/1087; H04L 67/18
See application file for complete search history.

(56) References Cited

U.S. PATENT DOCUMENTS

| | | | |
|---|---|---|---|
| 5,732,214 A | 3/1998 | Subrahmanyam | |
| 8,447,801 B1 | 5/2013 | Roche et al. | |
| 2012/0309417 A1* | 12/2012 | Blom ...................... H04L 51/20 |
| | | | 455/456.1 |
| 2013/0036307 A1* | 2/2013 | Gagliano ................ H04L 9/321 |
| | | | 713/171 |

(Continued)

OTHER PUBLICATIONS

Moni Naor et al., "Novel Architectures for P2P Applications: The Continuous-Discrete Approach", ACM Transactions on Algorithms, ACM, US, vol. 3, No. 3, (Aug. 1, 2007), pp. 34-es, XP058082796, ISSN: 1549-6325, DOI: 10.1145/1273340.1273350.

(Continued)

*Primary Examiner* — Djenane M Bayard
(74) *Attorney, Agent, or Firm* — Harness, Dickey & Pierce, P.L.C.

(57) ABSTRACT

In an example embodiment, a device includes a memory having computer-readable instructions stored therein and a processor. The processor is configured to execute the computer-readable instructions to configure a device as a node in a cloud storage structure formed over a local area network and exchange a file available on the cloud storage structure without obtaining the file from a remote server outside of the cloud storage structure.

19 Claims, 9 Drawing Sheets

(56) References Cited

U.S. PATENT DOCUMENTS

| | | | |
|---|---|---|---|
| 2013/0283231 A1* | 10/2013 | Van Megchelen | ........................... G06F 17/30876 717/106 |
| 2014/0047263 A1 | 2/2014 | Coatney et al. | |
| 2014/0122866 A1 | 5/2014 | Haeger et al. | |
| 2014/0274084 A1 | 9/2014 | Ross | |
| 2017/0295228 A1* | 10/2017 | Surtani | ............... H04L 67/1061 |
| 2017/0315876 A1* | 11/2017 | Dornquast | ........ G06F 17/30174 |

OTHER PUBLICATIONS

Keong Eng et al., "A Survey and Comparison of Peer-to-Peer Overlay Network Schemes", IEEE Communications Surveys & Tutorials @Bullet Second Quarter, (Jan. 1, 2005), XP055428250, Retrieved from the Internet: <URL:https://www.cl.cam.ac.uk/research/dtg/www/files/publications/public/mp431/ieee-survey.pdf>.

Collective: "Cloud computing—Wikipedia", (Aug. 30, 2016), XP055428273, Retrieved from the Internet: <URL:http//en.wikipedia.org/w/index.php?title=Cloud_computing&oldid=736825765>.

Beverly Yang et al., "Comparing Hybrid Peer-to-Peer Systems", Proceeding VLDB '01 Proceedings of the 27th International Conference on Very Large Data Bases, (Jan. 1, 2001), XP55428246, Retrieved from the Internet: <URL:http://ilpubs.stanford.edu:8090/455/1/2000-35.pdf>.

John Augustine et al., "Storage and Search in Dynamic Peer-to-Peer Networks", Proceedings of the 25th ACM Symposium on Parallelism in Algorithms and Architectures, SPAA '13, (Jan. 1, 2013), p. 53-62, XP055429149, New York, New York, USA, DOI: 10.1145/2486159.2486170 ISBN: 978-1-4503-1572-2.

Xuan Bao, Uichin Lee, Ivica Rimac, and Romit Roy Choudhury, "DataSpotting: offloading cellular traffic via managed device-to-device data transfer at data spots", Mobile Computing and Communications Review 14(3): 37-39 (2010).

Xuan Bao, Yin Lin, Uichin Lee, Ivica Rimac, and Romit Roy Choudhury, "Dataspotting: exploiting naturally clustered mobile devices to offload cellular traffic", in Proc.of IEEE Infocom. 2013.

Eduardo Cuervo, Aruna Balasubramanian, Dae-ki Cho, Alec Wolman, Stefan Saroiu, Ranveer Chandra, Paramvir Bahl, "MAUI: making smartphones last longer with code offload",Proc. ACM MobiSys 2010: 49-62.

Utsav Drolia, Nathan D. Mickulicz, Rajeev Gandhi, and Priya Narasimhan, "Krowd: A Key-Value Store for Crowded Venues", in Proc. of ACM MobiArch, 2015.

Qualcomm to Demonstrate New Peer-to-Peer Technology at Mobile World Congress, <https://www.qualcomm.com/news/releases/2011/02/08/qualcomm-demonstrate-new-peer-peer-technology-mobile-world-congress>.

Kyunghan Lee <http://dblp.uni-trier.de/pers/hd/l/Lee:Kyunghan>, Joohyun Lee <http://dblp.uni-trier.de/pers/hd/l/Lee:Joohyun>, Yung Yi <http://dblp.uni-trier.de/pers/hd/y/Yi:Yung>, Injong Rhee <http://dblp.uni-trier.de/pers/hd/r/Rhee:Injong>, and Song Chong <http://dblp.uni-trier.de/pers/hd/c/Chong:Song>, "Mobile Data Offloading: How Much Can WiFi Deliver?", IEEE/ACM Trans. on Networking. 21(2) <http://dblp.uni-trier.de/db/journals/ton/ton21.html>: 536-550 (2013).

Liam McNamara, Cecilia Mascolo and Licia Capra, "Media sharing based on colocation prediction in urban transport", in Proc. of ACM MobiCom, 2008.

Rajesh Krishna Panta, Rittwik Jana, Fan Cheng, Yih-Farn Robin Chen, Vinay A. Vaishampayan, "Phoenix: Storage Using an Autonomous Mobile Infrastructure", IEEE Transactions on Parallel Distributed Systems, 24(9): 1863-1873 (2013).

J. A. Silva, H. Paulino, and J. M. Lourenco, "Crowd-Sourcing Mobile Devices to Provide Storage in Edge-Clouds", In Proc of the Doctoral Symposium of the 16th International Conference on Distributed Computing and Networking (ICDCN), Jan. 2015.

John Dilley et al., "Globally Distributed Content Delivery," Global Deployment of Data Centers, IEEE Internet Computing, <http://computer/org/internet>, Sep.-Oct. 2002, pp. 50-58.

LogMeIn, "LogMeIn Backup User Guide," LogMeIn, Inc., 2010, pp. 1-38.

International Preliminary Report on Patentability and Written Opinion for PCT/US2017/048113, dated Mar. 5, 2019.

* cited by examiner

SYSTEMS AND METHODS OF PROVIDING AN EDGE CLOUD STORAGE AND CACHING SYSTEM OPERATING OVER A LOCAL AREA NETWORK

BACKGROUND

In today's world, end users, via their corresponding devices are generating and consuming more and more content of all types in addition to sharing the same with other users. Currently, a user utilizes one or more of various cloud storage services commercially available for retrieving, storing and sharing data and content. However, reliance on such commercially available cloud storage services makes end users susceptible to problems such as long retrieval times, loss of data and/or even stolen data.

As an example, it is common for an end user or a group of end users (e.g., a family), to own multiple mobile and/or stationary devices (hereinafter referred to collectively as devices) with large amounts of individual and combined memory and disk space. Many such devices are typically equipped with a few gigabytes (GB) of memory and solid state disk space. Furthermore, all such devices may share the same service provider for broadband network access. It is becoming common for end users to share data and content among themselves using the devices sharing the same network service plan.

Using the traditional approach of individually accessing a commercially available cloud storage service to retrieve, store and share content and/or data, results in multiple downlink and/or uplink transmissions by such devices requesting the same content, which results in an inefficient use of the service provider's broadband network.

SUMMARY

In an example embodiment, a device includes a memory having computer-readable instructions stored therein and a processor. The processor is configured to execute the computer-readable instructions to configure a device as a node in a cloud storage structure formed over a local area network and exchange a file available on the cloud storage structure without obtaining the file from a remote server outside of the cloud storage structure.

In yet another example embodiment, the processor is configured to execute the computer-readable instructions to configure the device by generating a unique node identification (ID) for the device, and designating the device as one of a regular node, a primary anchor node or a secondary anchor node of the cloud storage structure, the primary anchor node being configured to maintain at least one of a global list of active nodes on the cloud storage structure, a global list of missing nodes from the cloud storage structure, a list of most recent file retriever nodes and a temporary copy of at least one retrieved file, the secondary anchor node being configured to serve as a temporary anchor node for the cloud storage structure when the primary anchor node is unavailable, the list of most recent file retriever nodes identifying nodes of the cloud storage structure that most recently retrieved a copy of at least one file.

In yet another example embodiment, if the device is configured as the primary anchor node, the processor is configured to execute the computer-readable instructions to receive at least one keep alive message from at least one regular node of the cloud storage structure, and generate the global list of active nodes based on the received at least one keep alive message.

In yet another example embodiment, if the device is configured as the regular node, the processor is configured to execute the computer-readable instructions to generate a keep alive message, transmit the keep alive message to an anchor node, determine if the device is configured as a secondary anchor node, upon determining that the device is configured as the secondary anchor node and receiving an indication that the device is to serve as the temporary anchor node, operate the device as the temporary anchor node of the cloud storage structure until the processor receives an indication to terminate the operation of the device as the temporary anchor node of the cloud storage structure.

In yet another example embodiment, the processor is configured to execute the computer-readable instructions to generate the keep alive message based on at least one of a user input, a detection of a dynamic host configuration request of the device, an expiration of a timer configured by the user and a system default value.

In yet another example embodiment, if the device is configured as a regular node, the processor is configured to execute the computer-readable instructions to exchange the file by generating a key for the file, determining if the file is available at one of a local cache at the device and at least one other node of the cloud storage structure, retrieving the file from one of the local cache at the device and the at least one other node of the cloud storage structure upon determining that the file is available at one of the local cache of the device and the at least one other node of the cloud storage structure, and retrieving the file from the remote server upon determining that the file is not available at one of the local cache of the device and the at least one other node of the cloud storage structure.

In yet another example embodiment, the processor is configured to retrieve the file from the local cache at the device if the generated key matches a key in a local list of keys stored at the device.

In yet another example embodiment, the processor is configured to retrieve the file from one of the at least one other node of the cloud storage structure and the remote server if the processor determines that the generated key does not match a key in the local list of keys stored at the device.

In yet another example embodiment, the processor is configured to generate a local list of keeper nodes for the file based on the generated key and a duplication factor, the local list of keeper nodes including a node ID of at least one node of the cloud storage structure at which a copy of the file should be available, the duplication factor determining a number of nodes at which a copy of the file should be available, receive the global list of active nodes of the cloud storage structure from an anchor node of the cloud storage structure, determine if at least one node ID in the local list of keeper nodes matches a node ID in the global list of active nodes, and retrieve the file from at least one other regular node of the cloud storage structure if the processor determines that there is a match between the at least one node ID in the local list of keeper nodes and the node ID in the global list of active nodes, the at least one other regular having anode ID corresponding to the at least one node ID.

In yet another example embodiment, the processor is configured to execute the computer-readable instructions to retrieve the file from the at least one other regular node of the cloud storage structure if the at least one other node of the cloud storage structure has the copy of the file.

In yet another example embodiment, if the processor determines that there is no match between any node ID in the local list of keeper nodes and the global list of active nodes of the cloud storage structure, the processor is configured to execute the computer-readable structures to retrieve the file from at least one of the anchor node, a most recent retriever of the file known to the anchor node based on the list of most recent file retriever nodes, and the remote server.

In yet another example embodiment, the processor is configured to execute the computer-readable instructions to retrieve the file from the remote server node if the copy of the file is not available at the anchor node or the most recent retriever of the file.

In yet another example embodiment, upon retrieving the file from the remote server, the processor is configured to execute the computer readable instructions to issue a store command for storing the retrieved file to every node having a node ID in the local list of keeper nodes and the global list of active nodes, generate a list of missing nodes, the list of missing nodes including a node ID of every node in the local list of keeper nodes that is not included in the global list of active nodes, and send the generated list of missing nodes and a copy of the retrieved file to the anchor node, the anchor node providing a copy of the retrieved node to every missing node upon each missing node returning to the cloud storage structure.

In yet another example embodiment, if the device is configured as the primary anchor node, the processor is configured to execute the computer-readable instructions to exchange the file by generating a key for the file, and determining if the file is available at one of a local cache at the anchor node and at least one other node of the cloud storage structure, retrieving the file from one of the local cache at the anchor node and the at least one other node of the cloud storage structure upon determining that the file is available at one of the local cache of the anchor node and the at least one other node of the cloud storage structure, and retrieving the file from the remote server upon determining that the file is not available at one of the local cache of the anchor node and the at least one other node of the cloud storage structure.

In yet another example embodiment, the processor is configured to execute the computer-readable instructions to retrieve the file locally from the local cache of the anchor node if the file is available at the local cache of the anchor node, if the file is not available at the cache of the anchor node, determine if the file is available at another regular node of the cloud storage structure based on a local list of keeper and the global list of active nodes, determine if the key matches a key stored in the list of most recent file retriever nodes, if the processor determines that the file is not available at any other regular node, and retrieve a copy of the file from a most recent retriever node of the file if the key matches the key stored in association with a node ID of the most recent retriever node in the list of most recent file retriever nodes.

In yet another example embodiment, the device moves outside of a coverage area of the local area network upon being configured as the node in the cloud storage structure, and the device is configured to establish a network connection via another local area network.

In yet another example embodiment, the processor is configured to execute the computer-readable instructions to generate a key for the file, generate a list of active nodes of the cloud storage structure available over the other local area network, generate a local list of keeper nodes for the file based on the generated key and a duplication factor, the local list of keepers including node ID of at least one node of the cloud storage structure at which a copy of the file should be available, the duplication factor determining a number of nodes at which a copy of the file should be available, determine if at least one node ID in the local list of keeper nodes matches a node ID in the list of active nodes, retrieve the file from one of a remote server and another active node over the other local area network based on the generated list of active nodes and the generated local list of keepers, and update an anchor node of the cloud storage structure with information corresponding to the retrieved file upon returning to the cloud storage structure.

In yet another example embodiment, the processor is configured to execute the computer-readable instructions to exchange the file by receiving an inquiry for availability of the file from another node of the cloud storage structure, and providing the requested file to the other node of the cloud storage structure if the device has the requested file stored thereon and the other node of the cloud storage structure transmits a fetch request to the device for receiving the file.

In yet another example embodiment, prior to leaving the cloud storage structure, the processor is configured to execute the computer-readable instructions to transfer files stored on the device, to a successor node of the device in the cloud storage structure based on a storage capacity of the successor node.

In yet another example embodiment, prior to transferring the stored files to the successor node, the processor is configured to execute the computer-readable instructions to query the successor node to determine an amount of free storage space available on the successor node, and transfer only the most recently used portion of the stored files for storage on the successor node, if the amount of free storage available on the successor node is less than a size of the stored information on the device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
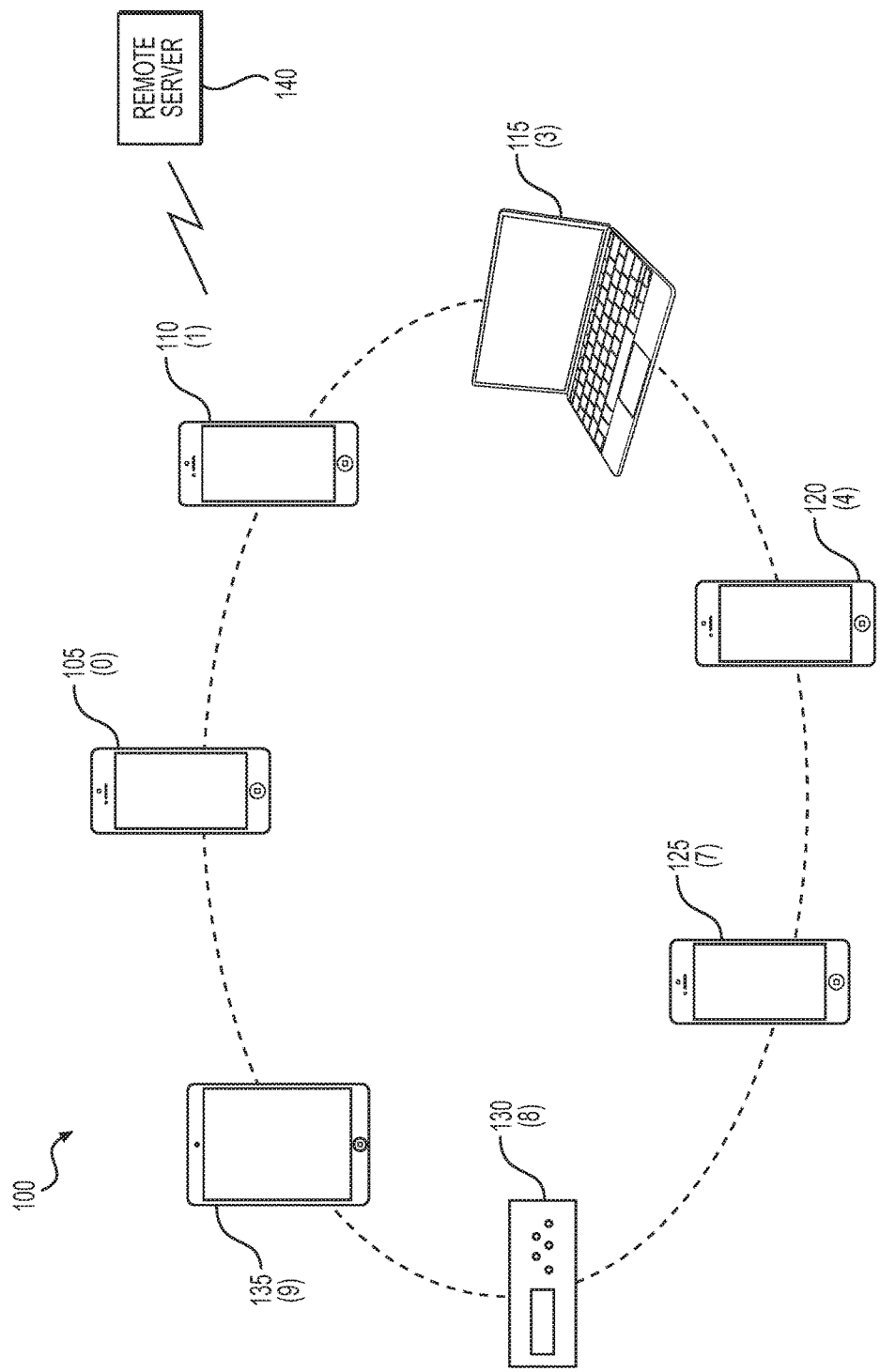
FIG. 1 illustrates an edge cloud storage and caching system (ECS), according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

As described above, when multiple devices, as part of a group of devices, use a commercially available cloud storage service to retrieve, store and/or share the same content or data, multiple downlink and/or uplink transmissions would be established with the cloud storage service provider, and this results in an inefficient use of the cloud storage service' providers bandwidth.

Example embodiments described herein provide an Edge Cloud Storage and Caching System (ECS) for a group of consumers/users (a group of devices associated with the group of consumers) sharing a broadband network access data plan, where the group of devices are used in close proximity to one another over a local area network (LAN). Such group of devices may be owned by one user, who may or may not belong to a family of two or more users. Moreover, each device in such group of devices may belong to one member of the family. In one example embodiment, the ECS utilizes storage capacity of the group of devices and presents to the user a standard application program interface (API) for easy access to content/files.

With this ECS system, a user may quickly and efficiently retrieve content that has been stored in the ECS using a LAN or a wireless LAN (WLAN), such as WiFi. In one example embodiment, the ECS system may then be used to store both content generated by the users in the ECS system as well as published content over the Internet.

In one example embodiment, as a storage system for user generated content, the ECS offers the ability to retrieve content from devices close by without accessing the Internet.

Hereinafter, the terms user, end user and/or consumer may be used interchangeably with a corresponding user device, end user device, consumer device and/or simply a device.

FIG. 1 illustrates an edge cloud storage and caching system (ECS), according to an example embodiment. Hereinafter, the ECS may also be referred to as cloud storage ring, a ring or a cloud storage structure.

As shown in FIG. 1, the ECS 100 includes a plurality of devices 105, 110, 115, 120, 125, 130 and 135. Each of the plurality of devices 105, 110, 115, 120, 125, 130 and 135 may hereinafter be referred to as a node. Each of the devices 105, 110, 115, 120, 125, 130 and 135 may have a corresponding node ID (e.g., 0, 1, 3, 4, 7, 8 and 9 shown in FIG. 1, which will be defined and further described below). Each of the devices 105, 110, 115, 120, 125, 130 and 135 may be a mobile device or a stationary device, including any one of, but not limited to, a mobile phone, a tablet, a laptop computer, a stationary personal computer (PC), a receiver box, a digital video recorder (DVR), etc. In one example embodiment, the nodes 105, 110, 115, 120, 125, 130 and 135 are connected to one another via a single LAN/WLAN network (not shown). Furthermore, the nodes 105, 110, 115, 120, 125, 130 and 135 may be part of a cellular wireless group plan provided by a service provider (hereinafter may also be referred to as the corresponding cellular wireless network network).

FIG. 1 also illustrates a remote server 140. The remote server 140 may be accessed by any of the nodes 105, 110, 115, 120, 125, 130 and 135 to retrieve a file (content or data) if the file requested by one or more of the nodes 105, 110, 115, 120, 125, 130 and 135 is not available on the ECS 100.

This will be further described below. In one example embodiment, the communication between any of the devices 105, 110, 115, 120, 125, 130 and/or 135 and the remote server 140 may be established via the LAN/WLAN network, through the service provider's broadband access network to reach the Internet, such as DSL, FiOS, Satellite links, etc., the corresponding cellular wireless network and/or a combination of the LAN/WLAN and the corresponding cellular wireless network, as is known in the art.

While in FIG. 1, the ECS 100 and the nodes thereof are shown as having a ring formation, example embodiments are not limited to. For example, the nodes may be spread all over a geographical area and at random locations, where the geographical area is under the coverage of a LAN/WLAN through which the nodes 105, 110, 115, 120, 125, 130 and 135 communicate.

Figure 2:
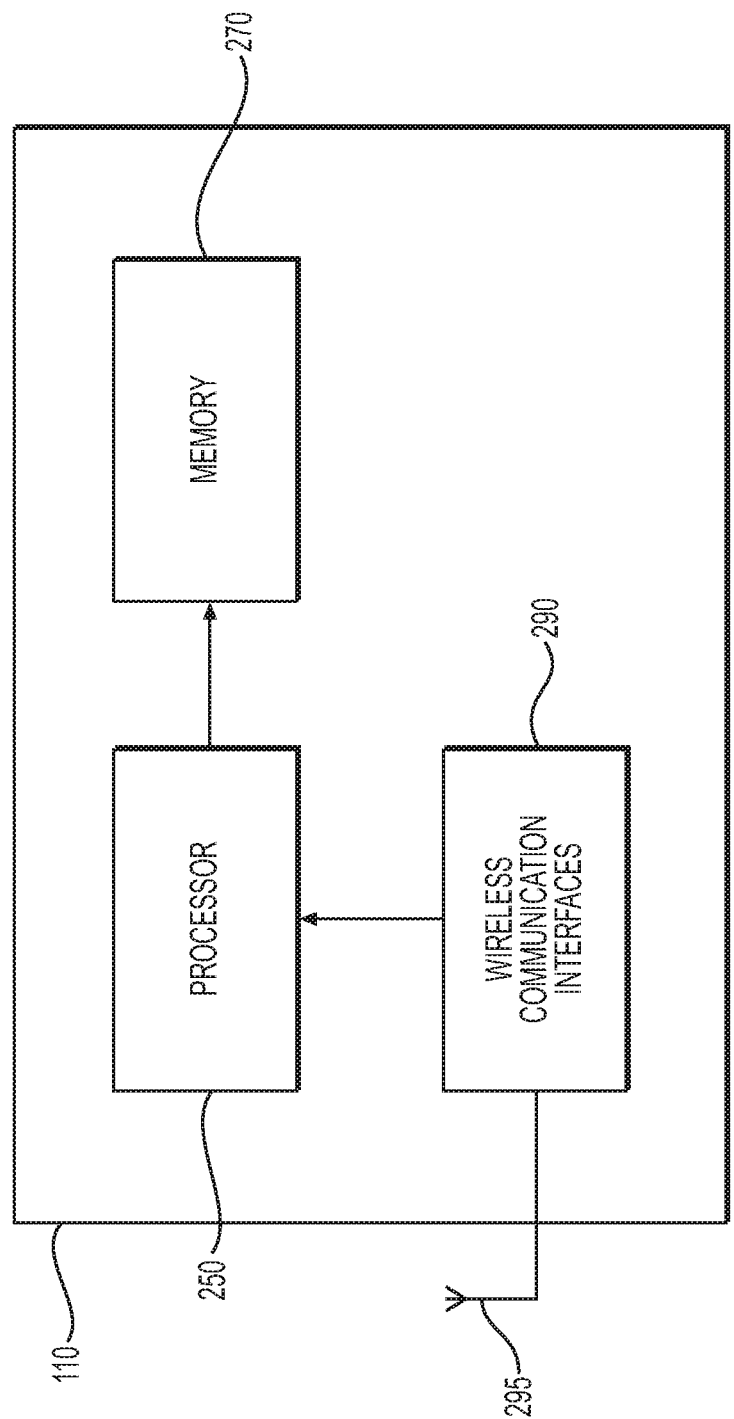
FIG. 2 illustrates a structure of an ECS node, according to an example embodiment.

FIG. 2 illustrates a structure of an ECS node, according to an example embodiment. FIG. 2 illustrates the structure of the node 110 as a representative node of the ECS 100. However, any of the nodes of the ECS 100 (any of the nodes 105, 115, 120, 125, 130 and/or 135) may have the same structure. Furthermore, the node 110 shown in FIG. 2 (or any other of the nodes 105, 115, 120, 125, 130 and/or 135) may have other components (not shown) for performing their corresponding functionalities, as is known in the art.

Referring to FIG. 2, the node 110 includes: a memory 270; a processor (or processing circuit) 250 connected to the memory 270; various interfaces 290 connected to the processor 250; and an antenna 295 connected to the various interfaces 290. The various interfaces 290 and the antenna 295 may constitute a transceiver for transmitting/receiving data from the node 110. As will be appreciated, depending on the implementation, the node 110 may include many more components than those shown in FIG. 2 (e.g., a display, a keyboard, an audio interface, video interface, etc.). However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores an operating system and any other routines/modules/applications for providing the functionalities of the node 110 (e.g., functionalities of a node, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components (e.g., a keyboard such as a virtual keyboard, a display, an audio capturing interface, a video capturing interface, etc.). As will be understood, the interfaces 290 and programs stored in the memory 270 to set forth the special purpose functionalities of the device 110 will vary depending on the implementation of the device 110.

Prior to describing example embodiments of how the ECS 100 functions, a few definitions and conditions will be described.

In one or more example embodiments, a distributed hash table (DHT) infrastructure is used by the ECS 100 of FIG. 1. As described above with reference to FIG. 1, each device (each of the devices 105, 110, 115, 120, 125, 130 and 135) is referred to as a node in the ECS system 100 where each node has a unique logical node ID.

In one or more example embodiments, content and/or data stored in the ECS 100 in the form of (key, value) pairs where the key is the unique content ID and the value is the content/data in the form of a file. Hereinafter, the term file will be used to refer to the content/data. In one or more example embodiments, the (key, value) pairs are distributed to different nodes within the ECS 100.

In one or more example embodiments, a globally unique node ID is used to identify each node in the ECS 100. Devices today are typically equipped with multiple interfaces, each with a unique media access control (MAC) address. Furthermore, each MAC address may be assigned a different internet protocol (IP) address every time the MAC address is associated with a network.

In one or more example embodiments, one MAC address for each of the nodes 105, 110, 115, 120, 125, 130 and 135 is selected in order to generate a corresponding node ID for the node. In one example embodiment, the WiFi MAC address for a mobile device such as the node 110 is selected for generating a corresponding node ID and a LAN MAC address is selected for a stationary device (e.g., the DVR 130 shown in FIG. 1) for generating a corresponding node ID.

In one or more example embodiments, hashing is used to produce the node IDs of the nodes of the ECS 100 and the content keys such that the generated node IDs and the content keys are uniformly distributed in the same address space with a negligible chance of collision. More specifically, each of the devices 105, 110, 115, 120, 125, 130 and 135 applies a hash function or algorithm (e.g., the secure hash algorithm 1 (SHA-1, SHA-2 or SHA-3)) to the selected MAC address to generate a unique 160-bit node ID (for SHA-1), a 224-256 bit unique node ID for SHA-2 or a 224-512 bit unique node ID for SHA-3 that does not vary with time or location of the device.

In one or more example embodiments, each file is uniquely identified with a corresponding universal resource locator (URL). In one or more example embodiments, the same hash algorithm (e.g., SHA-1, SHA-2 or SHA-3) is applied to the URL of each file in order to generate a unique 160-bit content key (key) for the file (for SHA-1), a 224-256 bit unique key for SHA-2 or a 224-512 bit unique key for SHA-3.

Hash functions or algorithms used to generate the node IDs and keys, may or may not be identical.

In one or more example embodiments (such as that shown in FIG. 1), the nodes of the ECS 100 are organized in a ring shape where the nodes are placed in the clockwise direction with strictly increasing node ID values. Accordingly, the node ID of the node 105 is less than the node ID of the node 110, the node ID of the node 110 is less than the node ID of the node 115, etc.

In one or more example embodiments, each node of the ECS (e.g., a reference node) has a successor node and a predecessor node. The successor node to the reference node is the next node on the ring in the clockwise direction having a higher node ID value assigned thereto relative to the value of node ID of the reference node. The predecessor node to the reference node is the next node in the counter-clockwise direction having lesser node ID value assigned thereto relative to the value of the node ID of the reference node. For example, the node 115 (with a node ID value of 3) is a successor to the node 110 (with a node ID value of 1) and the node 105 (with a node ID value of 0) is a predecessor to the node 110 (with a node ID value of 1).

In one or more example embodiment, a successor node to a key is the first node on the ring in the clockwise direction with a corresponding node ID that is the same as or greater than the key. For example, assuming that the hash algorithm (SHA-1, SHA-2, or SHA-3) returns a node ID 1 for the node 110, a node ID 3 for the node 115, and that the hash algorithm (SHA-1, SHA-2, or SHA-3) returns a key 2 for a file A key(file-A)=2), then node 115 is the successor node to the key 2.

Hereinafter and for purposes of illustrating the example embodiments, it is assumed that the hash algorithm (SHA-1, SHA-2, or SHA-3) generates node IDs 0, 1, 3, 4, 7, 8 and 9 for nodes 105, 110, 115, 120, 125, 130 and 135 of the ECS 100, respectively (as also shown in FIG. 1 and mentioned above).

In one or more example embodiments, for each file in the system, the node that most recently requested the file from the remote server 140 will be referred to as the retriever of the file.

In one or more example embodiment, a node from among the nodes 105, 110, 115, 120, 125, 130 and 135 of the ECS 100 will be configured as an anchor node (which may also be referred to as a primary anchor node). Furthermore, another one of the nodes 105, 110, 115, 120, 125, 130 and 135 of the ECS 100 will be configured as a secondary anchor node such that when the anchor node becomes inaccessible or unavailable, the secondary anchor node becomes the anchor node temporarily until the anchor node is accessible/available again.

In one or more example embodiments, each of the nodes of the ECS 100 may have an application program interface (API) installed thereon through which a user thereof designates/configures the node (e.g., enter the IP address of the node) as the anchor node. In one example embodiment, through the API and in a similar manner as designating the anchor node, a user of a node configures/designates any of the other nodes of the ECS 100 as the secondary anchor node. In one example embodiment, a node that has a relatively stable IP address (e.g., the DVR 130) is configured as the anchor node.

In one example embodiment, the API may be provided to each node by a service provider that provides the family plan to the nodes of the ECS 100. Alternatively, each node may purchase and download the API via an online application store that is commercially available.

Note that nodes of the ECS 100 may become disjoint because of movements of one or more nodes (e.g., when nodes 110 and/or 120 move outside of the coverage area of the LAN/WLAN). Therefore in one example embodiment, the anchor node keeps a list of retrievers, as defined above, for the file where each retriever represents the node that most recently requested the file from the remote server while still part of the ring.

In describing example embodiments, references may be made to various types of lists and tables. In one example embodiments, such lists and tables may be in the form of a hash table. However, example embodiments are not limited thereto.

Figure 3:
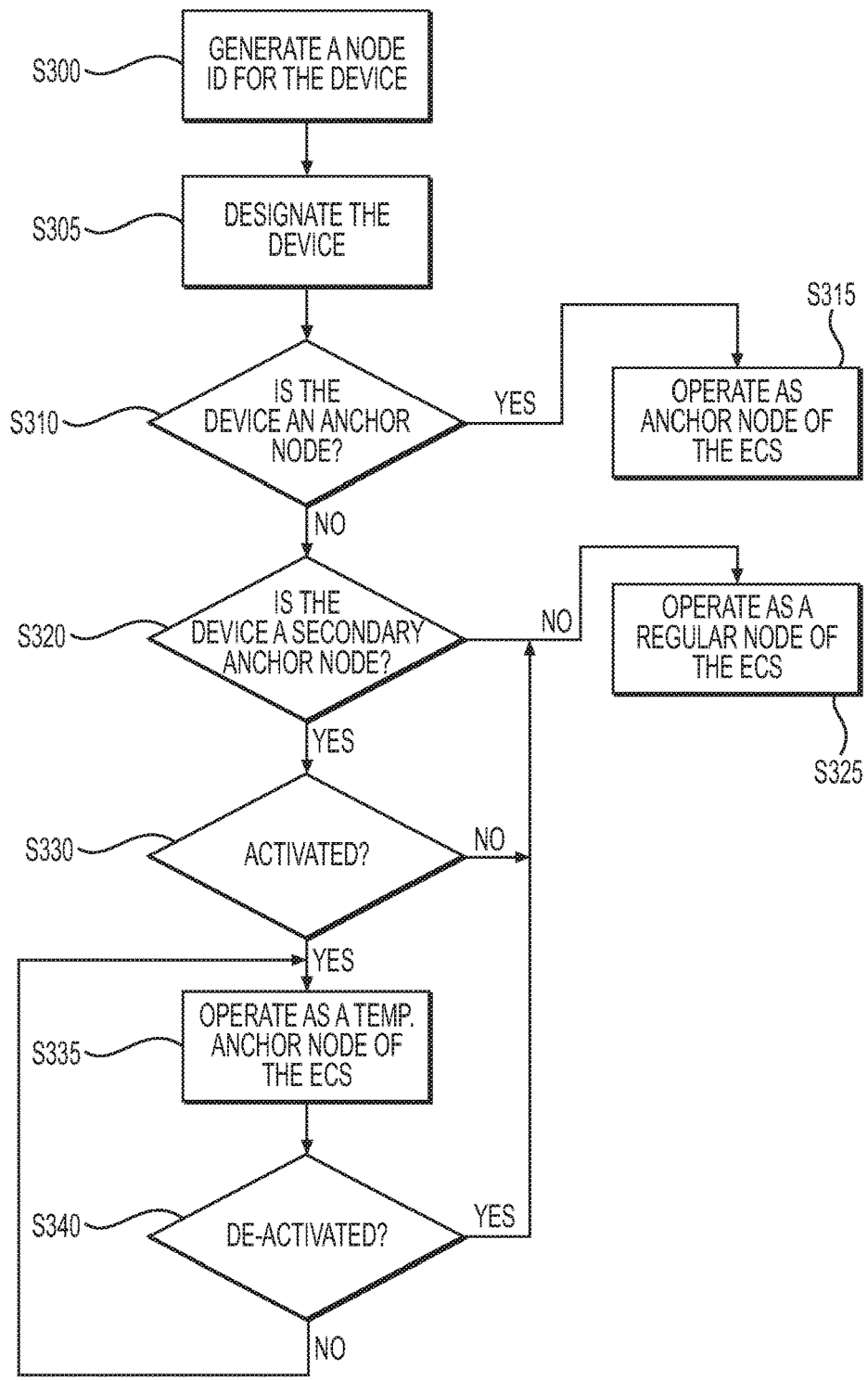
FIG. 3 illustrates a process of configuring a device as a node of the ECS of FIG. 1, according to an example embodiment.

FIG. 3 illustrates a process of configuring a device as a node of the ECS of FIG. 1, according to an example embodiment. FIG. 3 will be described with reference to FIGS. 1 and 2. FIG. 3 will be described from the perspective of the node 110, as a representative of the nodes of the ECS 100. More specifically, FIG. 3 will be described from the perspective of the processor 250 of the node 110 described above with reference to FIG. 2.

At S300, the processor 250 generates a node ID for the device 110, as described above (e.g., using the SHA-1, SHA-2, or SHA-3 hash algorithm).

At S305, the processor 250 designates the device 110 as one of an anchor node, a secondary anchor node or a regular node of the ECS 100.

In one example embodiment, if the processor 250, via the corresponding API, receives a user command to designate the device 110 as an anchor node (a primary anchor node), then the processor 250 designates the device 110 as an anchor node of the ECS 100. In one example embodiment, if the processor 250, via the corresponding API, receives a user command to designate the device 110 as a secondary anchor node, then the processor 250 designates the device 110 as a secondary anchor node of the ECS 100. In one example embodiment, if the processor 250, via the corresponding API, receives a user command to designate the device 110 as a regular node, then the processor 250 designates the device 110 as a regular node of the ECS 100.

At S310, the processor 250 determines whether the device 110 is designated as an anchor node. If the processor 250 determines that the device 110 is designated as an anchor node, then at S315, the processor 250 functions to operate the device 110 as an anchor node of the ECS 100. In one or more example embodiments, the anchor node 110 may operate as follows.

Initially and when the device 110 is configured as the anchor node 110 for the ECS 100, the anchor node 110 has no information about the ECS 100. Over time and upon receiving various types of information, as will be described below, the anchor node 110 creates several tables/lists including a global list of active nodes, a list of most recent file retriever nodes and a global list of missing nodes, all of which will be described in more detail below. Furthermore, the anchor node 110 may store temporary copies of files retrieved from the remote server 140 until one or more missing nodes (that are supposed to store copies of such files) become active participants in the ECS 100. The temporary storing of copies of files and the conditions, according to which the anchor node 110 stores such temporary copies of files, will be further described below.

In one example embodiment, and as part of operating as the anchor node for the ECS 100, the anchor node 110, via the processor 250, receives one or more "keep alive" messages from other nodes (regular nodes) of the ECS 100. In one or more example embodiments, a "keep alive" message may be generated by a regular node (e.g., periodically or whenever the regular node is attempting to retrieve a file) in order to signal the regular node's active status in the ECS 100, to the anchor node 110. "Keep alive" messages will be further described below.

In one example embodiment and based on the received "keep alive" messages, the processor 250 generates a global list of active nodes. For example, the anchor node 110 generates a list including node IDs of all regular nodes of the ECS 100 from which the processor 250 receives a "keep alive" message.

In one example embodiment, the processor 250 may periodically (or aperiodically) share the global list of active nodes with the regular nodes of the ECS 100. In one example embodiment, the processor 250 shares the global list of active nodes with each regular node upon receiving a "keep alive" message from each node. In another example embodiment, the processor 250 multicasts (e.g., periodically) the global list of active nodes over the LAN (WLAN) to all regular nodes of the ECS 100 reachable over the LAN/WLAN.

In one example embodiment and as part of operating as the anchor node of the ECS 100, the anchor node 110, via the processor 250, receives and stores most recent retrievers of files. In one example embodiment, the most recent retriever of a file is a node that most recently retrieved the file from the remote server 140 (the conditions according to which a node retrieves a file from a remote server will be described below). In one example embodiment, the processor 250 stores the most recent retrievers of files in a form of a list of node IDs of most recent file retriever nodes, where each entry in the list is in the form of (node ID, key), with the "node ID" corresponding to the node that most recently retrieved a file and the "key" corresponding to a hash value of the file that was most recently retrieved by the node having the node ID.

As will be described below with reference to FIG. 7, each regular node of the ECS 100, upon retrieving a file from the remote server 140, generates a local list of missing nodes that identify nodes of the ECS 100 that are supposed to have a copy of the retrieved files stored thereon (keeper nodes) but are not currently active in the ECS 100. In one example embodiment, each entry in the local list of missing nodes is in the form of (node ID, key), with the "node ID" corresponding to a keeper node that is supposed to have a copy of the retrieved file and the "key" corresponding to a hash value of the retrieved file.

Upon creating the local list of missing nodes, each node transmits the local list of missing nodes to the anchor node 110 in order for the anchor node 110 to generate a global list of missing nodes.

In one example embodiment and as part of operating as the anchor node of the ECS 100, the anchor node 110, via the processor 250, receives one or more local list of missing nodes and based thereon, generates a global list of missing nodes. In one example embodiment, such global list of missing nodes may have one or more entries. Each entry may be in the form of (node ID, key), where the "node ID" is an ID of a missing node and the "key" is the hash value of a file that is supposed to be stored at the node corresponding to the node ID.

In one example embodiment, the processor 250 receives one copy of a file for which there is at least one corresponding node ID in the global list of missing nodes. In one example embodiment, the processor 250 temporarily stores the received copy. As each missing node rejoins the ECS 100 (e.g., becomes an active node of the ECS 100), the processor 250 transmits a copy of the temporarily stored file at the anchor node 110, to each re-joined missing node. After all missing nodes rejoin and receive copies of the file the processor 250 deletes the temporarily stored copy of the file at the anchor node 110.

In one example embodiment, instead of immediately deleting the copy of the file as described above, the processor 250 marks the copy for deletion, which means that the copy of the file is maintained at the anchor node 110 until the anchor node 110 runs out of storage space. Once the anchor node 110 runs out of storage space, files (such as the temporarily stored copy of the file) marked for deletion, will be deleted.

The above examples describe various types of tasks performed by and various types of information/lists that are generated by, stored in and shared by the device 110 once configured as an anchor node of the ECS 100. Hereinafter, functionalities of the device 110, once configured as a regular node of the ECS 100 will be described.

Referring back to S310, if at S310, the processor 250 determines that the device 110 is not designated as an anchor node, at S320, the processor 250 determines whether the device 110 is designated as a secondary anchor node of the ECS 100.

If at S320, the processor 250 determines that the device 110 is not designated as the secondary anchor node of the ECS 100, then at S325, the processor 250 functions to operate the device 110 as a regular node of the ECS 100.

In one example embodiment and as part of operating as a regular node of the ECS 100, the node 110, via the processor 250, generates periodic "keep alive" messages. In one example embodiment, the processor 250 generates the "keep alive" message according to one or more triggering events.

One triggering event may be the connection of the device 110 to the LAN. Another triggering event may be a user input, received for the corresponding API, indicating that the user has entered the geographical area covered by the LAN. Another triggering event may be for a gateway of the LAN to detect the dynamic host configuration request (DHCP) request from the device 105 joining the ECS 100 and in response thereto, transmit a command to the processor 250 to generate periodic "keep alive" messages to an anchor node of the ECS 100. Another triggering event may be for an access point (AP) of the WLAN (WiFi) to detect the device 110 as a new WiFi client and transmit a command to the processor 250 directing the processor 250 to generate periodic "keep alive" messages to an anchor node of the ECS 100. Another triggering event may be an expiration of a time configured by a user of the node 110 or a system default value.

Upon generating the "keep alive" message(s), the processor 250 transmits the generated periodic "keep alive" messages to an anchor node of the ECS 100 (in this case since the device 110 is no longer configured as an anchor node of the ECS 100, another device of FIG. 1 (e.g., the device 130) is configured as an anchor node of the ECS 100). As described above and upon receiving the "keep alive" message(s), the anchor node 130 generates the global list of active nodes, in which a node ID (1) of the regular node 110 is stored.

In one example embodiment and as part of operating as a regular node of the ECS 100, the node 110, via the processor 250, receives (e.g., periodically) the generated global list of active nodes from the anchor node 130, which the processor 250 utilizes in determining where to retrieve a requested file from (e.g., from another node of the ECS 100 or from the remote sever 140), as will be described below.

Referring back to S320, if at S320, the processor 250 determines that the device 110 is designated as the secondary anchor node of the ECS 100, then at S330, the processor 250 determines whether the device 110 is activated to operate as a temporary anchor node of the ECS 100.

In one example embodiment, the device 110 is activated as a temporary anchor node upon receiving an indication from the anchor node 130 of the ECS that the anchor node 130 is leaving the ECS 100 or when the anchor node 130 is no longer reachable via the LAN/WLAN of the ECS 100. Alternatively, the processor 250 determines whether the device 110 is activated as a temporary anchor node upon receiving a command from a user of the device 110 indicating that the device 110 should function as an anchor node.

If at S330, the processor 250 determines that the device 110 is not activated as a temporary anchor node of the ECS 100, the process reverts back to S325 and the processor 250 functions to operate the device as the regular node of the ECS 100.

However, if at S330, the processor 250 determines that the device 110 is activated as the temporary anchor node of the ECS 100, then at S335, the processor 250 functions to operate the device 110 as the temporary anchor node of the ECS 100.

In one example embodiment, prior to being activated as the temporary anchor node of the ECS 100, the device 110 operates as a regular node 110 of the ECS 100.

In one or more example embodiments, when the device 110 is activated as the temporary anchor node for the ECS 100, there may be one or more different schemes according to which the temporary anchor node 110 operates as the anchor node of the ECS 100 (e.g., obtains/generates various list(s)/table(s), similar to the list(s)/table(s) obtained/generated by the anchor node 130, as described above with reference to S315).

In one example embodiment, prior to leaving the ECS 100 (or alternatively abruptly terminating participation in the ECS 100 due to, for example, losing power), the anchor node 130 periodically sends the list(s)/table(s) generated by the anchor node 130 to the node 110. Accordingly, upon activation as the temporary anchor node, the node 110 has all the information (e.g., list(s)/table(s) such as the global list of active nodes, the global list of missing nodes, the list of most recent file retriever nodes, etc.) readily available for operating as the temporary anchor node of the ECS 100.

In one example embodiment, prior to leaving the ECS 100, the anchor node 130 of the ECS 100 transfers/transmits the list(s)/table(s) generated and stored at the anchor node 130 to the node 110, so that once activated as the temporary active node of the ECS, the node 110 would have the list(s)/table(s) readily available for operating as the temporary anchor node of the ECS 100.

In one example embodiment, once the node 110 is activated as the temporary anchor node 110, the node 110 receives information and generates the list(s)/table(s) in a similar manner as described above with reference to S315, without receiving the same from the anchor node 130 of the ECS.

Thereafter, at S340, the processor 250 determines whether the temporary anchor node 110 should be de-activated as the temporary anchor node of the ECS 100 and revert back to operating as a regular node of the ECS 100. In one example embodiment and upon the original anchor node's (e.g., node 130) return to the ECS 100, the original anchor node transmits a message to the temporary anchor node 110 informing the temporary anchor node 110 that the original anchor node is back online and will resume operating as the anchor node of the ECS 100. In one example embodiment, the temporary anchor node 110 may receive a user input indicating that the temporary anchor node 110 should revert back to functioning as a regular node of the ECS 100.

If at S340, the processor 250 determines that the temporary anchor node 110 should be de-activated as a temporary anchor node, the process reverts back to S325, where the device 100 operates as a regular node of the ECS 100.

However, if at S340, the processor 250 determines that the temporary anchor node 110 should not be de-activated as the temporary anchor node of the ECS, the process reverts back to S335 and S335 and S340 are repeated.

FIG. 3 and corresponding example embodiments, describe a configuration of a device as an anchor node, a regular node or a secondary anchor node of the ECS 100. Hereinafter and assuming that a device is already configured as either an anchor node or a regular node of the ECS 100, the processes for exchanging (e.g., retrieving, storing and sharing) files will be described.

Figure 4:
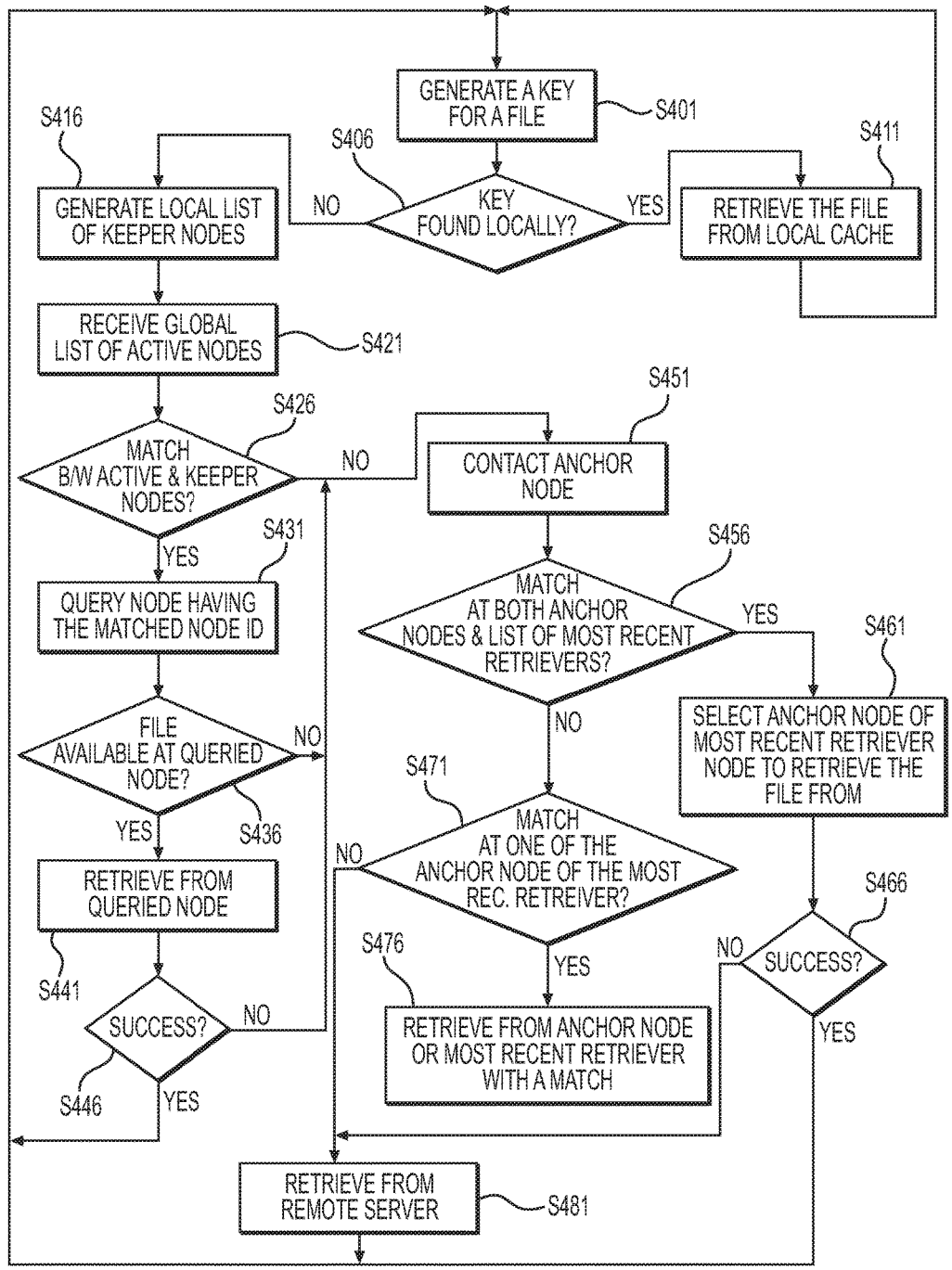
FIG. 4 illustrates a process of retrieving a file by a regular node of the ECS of FIG. 1, according to an example embodiment.

FIG. 4 illustrates a process of retrieving a file by a regular node of the ECS of FIG. 1, according to an example embodiment. FIG. 4 will be described with reference to FIGS. 1-3. FIG. 4 will be described from the perspective of the node 110, as a representative of the nodes of the ECS 100. More specifically, FIG. 4 will be described from the perspective of the processor 250 of the node 110 described above with reference to FIG. 2.

At S401, the processor 250 generates a key for a file requested by a user of the node 110. In one example embodiment, the requested file may be a video file. In one example embodiment and as described above, the processor 250 utilizes the SHA-1 (or SHA-2, or SHA-3) hash algorithm to generate a key for the URL of the file requested by the user.

At S406, the processor 250 determines whether the key has a match locally at the node 110. Each node of the ECS 100 may have a local cache where, depending on the size of a cache at each node, the node keeps copies of the files recently accessed by the node. Moreover, each node may store a table of keys for the files recently accessed by the node. Accordingly, the processor 250 determines whether the generated key has a match in the table of keys (local list of keys) at the node 110. The table of keys may be in the form of a hash table.

If the key has a match in the table of keys, then at S411, the processor 250 retrieves the file locally. Thereafter, the process reverts back to S401 until the node 110 initiates a process for retrieving another requested file.

However, if at S406, the processor 250 determines that the key does not have a match in the table of keys at the node 110, then at S416, the processor 250 generates a local list of keeper nodes. In one example embodiments, the local list of keeper nodes includes one or more node IDs of nodes of the ECS 100 at each of which a copy of the file for which the key is generated at S401, is supposed to be stored and available for retrieval. The local list of keeper nodes may be generated based on the key and a duplication factor as will be described below. The duplication factor may be a reconfigurable parameter set based on empirical studies, experiments and/or changed by users of the nodes of the ECS 100.

In one example embodiment, the processor 250 determines at least one keeper node for the requested file (which may be referred to as a primary keeper of the requested file). The processor 250 determines the primary keeper of the file to be a successor node to the generated key at S401. As defined above, a successor node to a key is the first node on the ring in the clockwise direction with a corresponding node ID that is the same as or greater than the key. The primary keeper node may be identified as having a node ID P. Accordingly, the primary keeper P=successor (key).

For example, assuming that the node ID of the node 110 is 1, the node ID of the node 115 is 3 and that the generated key for a file A, as determined at S401, is 2, the processor 250 determines the primary keeper for the key (i.e., the successor node to the key) to be the node 115 with the node ID 3. In other words, P is 3 in this example. In this example, one entry in the local list of keeper nodes in the form of (node ID, key) would be (3,2).

Furthermore, the processor 250 may have a duplication factor k stored therein. The duplication factor k determines a number of nodes (in addition to the primary keeper) at which a copy of the requested file is supposed to be available.

In one example embodiment, k is an integer greater than or equal to 2. Accordingly, the processor 250 generates the local list of keeper nodes as (P, key), (P(s1), key), (P(s2), key), . . . , where P(s1) is a node ID of a node that is a successor node to node ID P, P(s2) is a node ID of the a node that is a successor node to the node ID P(s1), etc. In one example embodiment, a number of entries in the local list of keeper nodes is equal to k.

As another example and assuming a duplication factor of k=3, in addition to the primary keeper (node 115 with the node ID 3), two other nodes, namely the node 120 (with the node ID 4) and the node 125 (with the node ID 7) would be among the nodes on each of which a copy of the generated key and the corresponding file is saved. Accordingly and in this example, the local list of keeper nodes includes 3 entries corresponding to node IDs for nodes 115, 120 and 125. In this example, entries in the local list of keeper nodes in the form of (node ID, key), include (3,2), (4,2) and (7,2).

At S421, the processor 250 receives a list of active nodes of the ECS 100 shared by the anchor node (e.g., node 130), as described above with reference to FIG. 3.

At S426, the processor 250 determines whether there is a match between at least one node ID in the local list of keeper nodes and a node ID in the list of active nodes received at S421.

If at S426, the processor 250 determines that there is a match (a matched node ID), then at S431, the processor 250 queries the node of the ECS having the corresponding matched node ID to determine the availability of the requested file at the node having the matched node ID.

At S436, the processor 250, based on a response received from the queried node, determines whether the queried node has a copy of the file. If at S436, the processor 250 determines that the queried node has the file, then at S441, the processor 250 issues a "fetch" request to retrieve the file from the node having the matched node ID. If at S436, the processor 250 determines that the node having the matched node ID does not have a copy of the file, the process proceeds to S451, which will be described below.

At S446, the processor 250 determines whether the retrieval process of the file from the queried node has been successful or not. If at S446, the processor 250 determines that the retrieval process has been successful, the process reverts back to S401 until the node 110 initiates a process for retrieving another requested file.

If at S446, the processor 250 determines that the retrieval process has not been successful, then the process proceeds to S451, which will be described below.

Referring back to S426, if the processor 250 determines that there is no match between a node ID in the local list of keeper nodes and a node ID in the received list of active nodes, then at S451, the processor 250 contacts (communicates) with the anchor node (e.g., node 130).

At S456, the processor 250 determines whether there is a match for the generated key at the anchor node (e.g., whether the anchor node has a copy (e.g., a temporary copy) of the file stored thereon) and the key matches with one of the keys stored in the list of most recent retrievers of files at the anchor node 130 (as described above with reference to FIG. 3).

If at S456, the processor 250 determines that the match for the key is found at both the anchor node 130 as well as the list of most recent retrievers, then at S461, the processor 250 selects one of the anchor node 130 or the most recent retriever of the requested file for retrieving the file from. In one example embodiment, the processor 250 may randomly select one of the anchor node 130 and the most recent retriever of the file.

Thereafter, at S466, the processor 250 determines whether the retrieval process of the file from one of the anchor node 130 or the most recent retriever of the requested file, has been successful or not. If at S466, the processor 250 determines that the retrieval process has been successful, the process reverts back to S401 until the node 110 initiates a process for retrieving another requested file.

If at S466, the processor 250 determines that the retrieval process has not been successful, then the process proceeds to S481, which will be described below.

In one example embodiment and given the random selection of one of the anchor node 130 or the most recent retriever of the requested file, the processor 250 determines that the retrieval process fails if the requests to both the anchor node and the most recent retriever node fail. In other words, the processor 250 first attempts to retrieve the requested file from the randomly selected one of the anchor node 130 or the most recent retriever of the requested file. If the first attempt fails, then the processor 250 attempts to retrieve the file from the other one of the anchor node 130 or the most recent retriever of the requested file.

Referring back to S456, if at S456, the processor 250 determines that the match for the key is not found at both the anchor node 130 and the most recent retriever of the requested file, then at S471, the processor 250 determines whether a match for the key is found at one of the anchor node 130 or the most recent retriever of the requested file. If at S471, the processor 250 determines that the match for the key has been found at only one of the anchor node 130 and the most recent retriever of the requested file, then at S476, the processor 250 retrieves a copy of the requested file from one of the anchor node 130 or the most recent retriever of the requested file at which the match for the key has been found.

However, if at S471, the processor 250 determines that no match has been found for the key at the anchor node 130 and the list of most recent retrievers, then at S481, the processor 250 retrieves the file from the remote server 140. Thereafter, the process reverts back to S401 until the node 110 initiates a process for retrieving another requested file.

Figure 5:
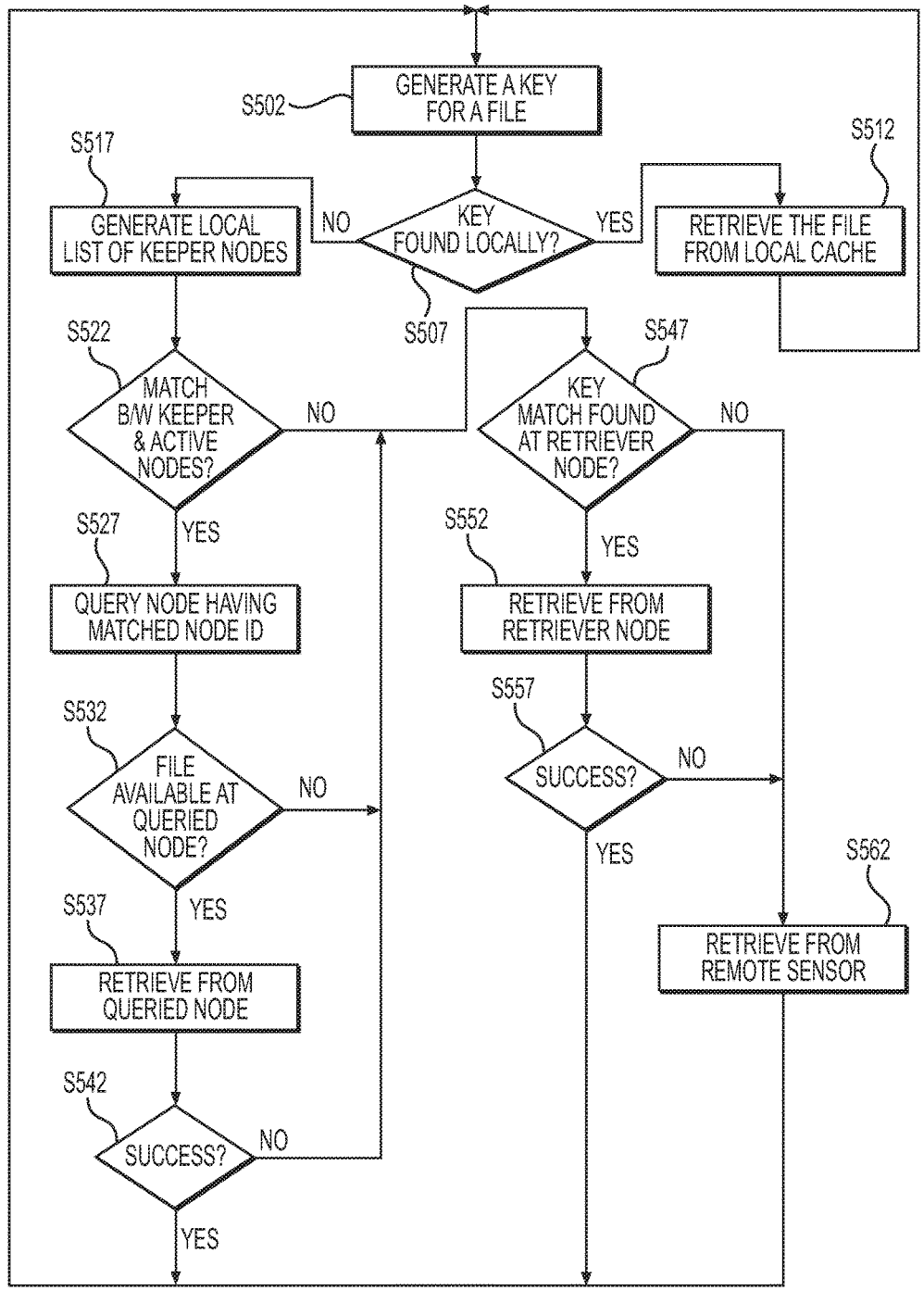
FIG. 5 illustrates a process of retrieving a file by an anchor node of the ECS of FIG. 1, according to an example embodiment.

FIG. 5 illustrates a process of retrieving a file by an anchor node of the ECS of FIG. 1, according to an example embodiment. FIG. 5 will be described with reference to FIGS. 1-4. FIG. 5 will be described from the perspective of the node 110, as a representative of the nodes of the ECS 100. More specifically, FIG. 5 will be described from the perspective of the processor 250 of the node 110 described above with reference to FIG. 2.

S502, S507, S512 and S517 are the same as S401, S406, S411 and S416 of FIG. 4, respectively. Accordingly and for sake of brevity, S502, S507, S512 and S517 will not be further described. S522, S527, S532, S537 and S542 are the same as S426, S431, S436, S441 and S446 of FIG. 4. Accordingly and for sake of brevity, S522, S527, S532, S537 and S542 will not be further described At S522, if the processor 250 determines that there is no match between a node ID in the local list of keeper nodes and a node ID the global list of active nodes, then at S547, the processor 250 determines if there is a match between the key for the requested file and a key associated with one node ID in the list of most recent retrievers of files at the anchor node 110. If there is not match, the process proceeds to S562, which will be described below.

If there is a match at S547, then at S552, the processor 250 retrieves the requested file from the most recent retriever of the requested file.

At S557, the processor 250 determines if the retrieval process is successful. If the processor 250 determines that the retrieval process has been successful, then the process reverts back to S502 until the node 110 initiates a process for retrieving another requested file.

However, if the processor 250 determines that the retrieval process is not successful, then at S562, the processor 250 retrieves the file from the remote server 140. Thereafter, the process reverts back to S502 until the node 110 initiates a process for retrieving another requested file.

In one or more example embodiments, after joining the ECS 100 as a node (e.g., a regular node or an anchor node), the node 110 may temporarily move away from (leave) the ECS 100 (e.g., move outside of the geographical area covered by the LAN/WLAN). Moreover, the device 110 may join another LAN/WLAN network. One or more additional nodes of the ECS 100 may concurrently or later on join the device 110 over the other LAN/WLAN network and together form another ECS (which may be referred to as a remote ECS or a remote sub ring). Subsequently, the device 110 (or any other device that participated in the remote ECS) may rejoin (return to) the ECS 100.

Figure 6:
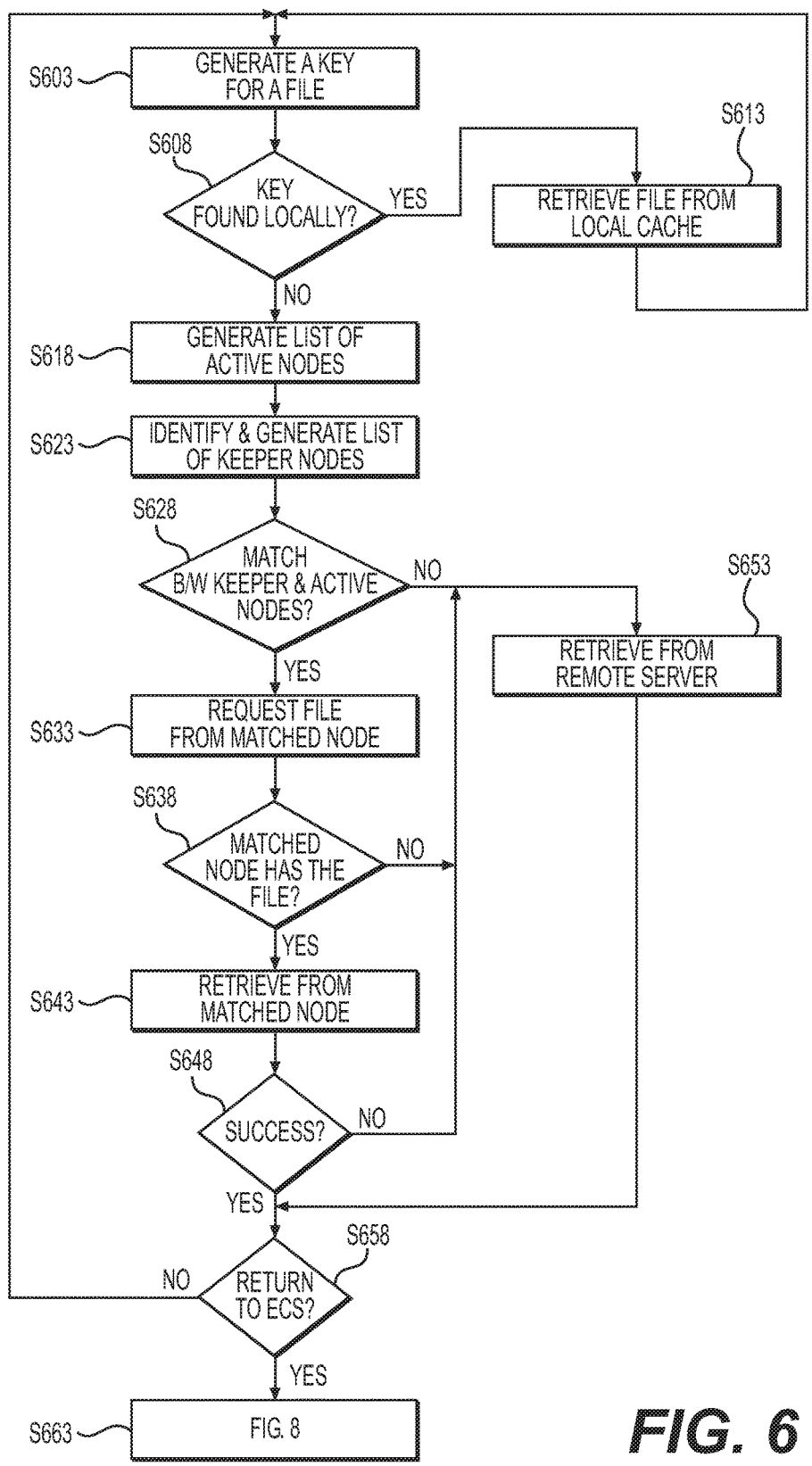
FIG. 6 illustrates a process of retrieving a file by a node of the ECS of FIG. 1 that forms a remote ECS over another LAN/WLAN after leaving the ECS of FIG. 1, according to an example embodiment.

FIG. 6 illustrates a process of retrieving a file by a node of the ECS of FIG. 1 that forms a remote ECS over another LAN/WLAN after leaving the ECS of FIG. 1, according to an example embodiment. FIG. 6 will be described with reference to FIGS. 1-5. FIG. 6 will be described from the perspective of the node 110, as a representative of the nodes of the ECS 100. More specifically, FIG. 6 will be described from the perspective of the processor 250 of the node 110 described above with reference to FIG. 2.

S603, S608 and S613 are the same as S401, S406 and S411 of FIG. 4, respectively. Accordingly and for sake of brevity, S603, S608 and S613 will not be further described.

At S618 and upon determining that the requested file is not locally available, the processor 250 generates a list of active odes over the remote ECS. Example embodiments are not limited to generating the list of active nodes over the remote ECS at S618. In one example embodiment, the processor 250 generates the list of active nodes at any point after establishing network connection over the other LAN/WLAN, described above.

In one example embodiment, when two or more nodes of the ECS 100 join the other LAN/WLAN to form the remote ECS, each will manually receive the IP address of other nodes on the remote ECS and thus creates the list of active nodes over the remote ECS. In other words, each node on the remote ECS, through the corresponding API, receives the IP address of the other nodes on the remote ECS (e.g., the user of each node manually enters the IP addresses of other nodes on the remote ECS into the device).

After the initial configuration process (the above-described manual configuration of nodes active over the remote ECS), in one example embodiment, each node on the remote ECS sends "keep alive" messages to all other nodes active on the remote ECS (e.g., periodically via multicast over the other LAN/WLAN or multiple individual messages to each of the other nodes active over the remote ECS). Upon receiving such "keep alive" messages, each node creates a list of node IDs for the nodes on the remote ECS from which a "keep alive" message is received. This process ensures that each node has list of active nodes on the remote ECS.

Accordingly, the processor 250 generates the local list of active nodes by manually receiving IP addresses of other nodes active over the other LAN/WLAN as part of the remote ECS.

Upon generating the local list of active nodes, the processor 250 performs S623. The process performed at S623 is the same as the processes performed at S416 of FIG. 4. Accordingly and for sake of brevity, S623 will not be further described.

S628, S633, S638, S643 and S648 are the same as S426, S431, S436, S441 and S446 of FIG. 4, respectively. Accordingly and for sake of brevity, S628, S633, S638, S643 and S648 will not be further described.

Upon a negative return (e.g., a "No" determination) at any one of S628, S638 and S648, the processor 250 performs the process at S653. In one example embodiment, S653 is the same as S481 of FIG. 4. Accordingly and for sake of brevity, S653 will not be further described.

Upon a successful retrieval of the requested file, at S648 or after the retrieval of the file from the remote server 140 at S653, at S658, the processor 250 determines if the node 110 has returned to the ECS 100 from the remote ECS. In one example embodiment, the processor 250 determines that the node 110 has returned to the ECS 100 upon detecting the LAN/WLAN over which the ECS 100 is formed.

If at S658, the processor 250 determines that the node 110 has returned to the ECS 100, the process moves to S663. S633 corresponds to the processes of FIG. 7, which will be described below. However, if at S658, the processor 250 determines that the node 110 remains active as part of the remote ECS, the process reverts back to S603 until the node 110 initiates a process for retrieving another requested file.

Example embodiments described above are directed to either configuring a device as a node of the ECS 100 and/or retrieving a file either locally from the requesting node, from another node of the ECS 100 or a remote server such as the remote server 140. Upon retrieval of a file from the remote server 140 (which indicates that the file has been retrieved by a node for the first time and thus no other node at the ECS 100 has a copy of the retrieved file), the retrieving node may perform a series of operations for storing the file (at keeper node(s) of the file), updating the anchor node on the retrieval (for the anchor node to update the list of most recent retrievals), providing the list of missing nodes for the anchor node to update the global list of missing nodes and/or providing a copy of the retrieved file for temporary storage at the anchor node, as described above with reference to FIG. 3. The above processes may be referred to as an ECS storing and updating process after a retrieval of a file from the remote server 140.

Figure 7:
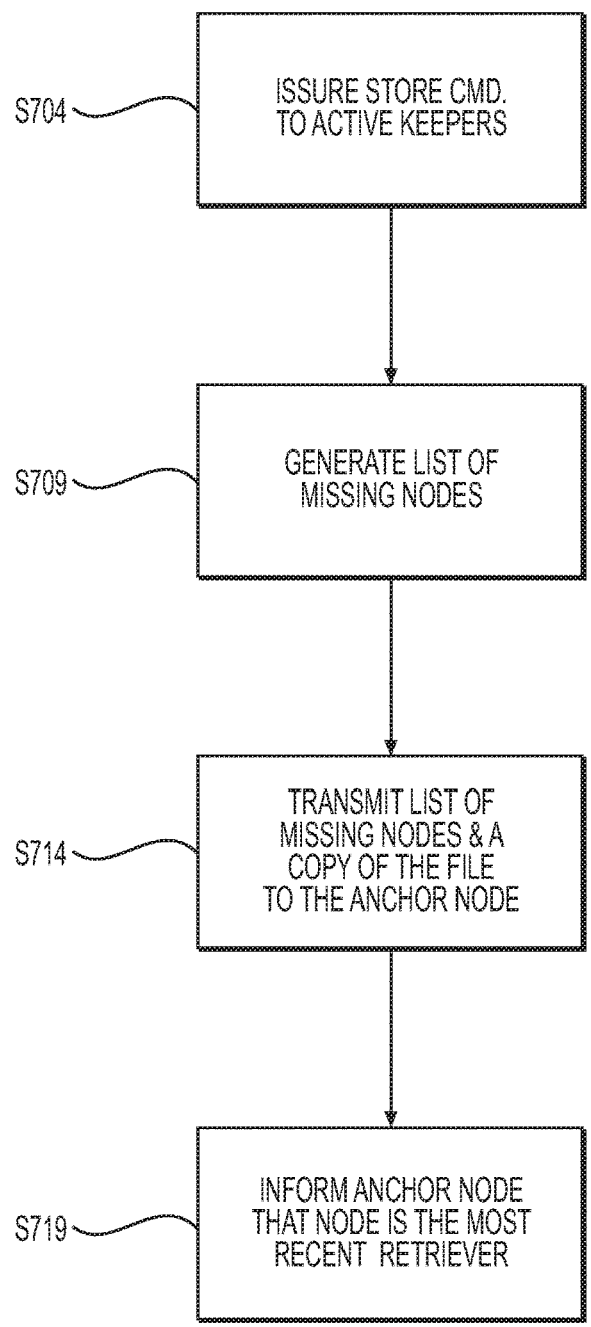
FIG. 7 illustrates an ECS storing and updating process after a retrieval of a file from a remote server, according to an example embodiment.

FIG. 7 illustrates an ECS storing and updating process after a retrieval of a file from a remote server, according to an example embodiment. FIG. 7 will be described with reference to FIGS. 1-6. FIG. 7 will be described from the perspective of the node 110, as a representative of the nodes of the ECS 100. More specifically, FIG. 7 will be described from the perspective of the processor 250 of the node 110 described above with reference to FIG. 2.

At S704, the processor 250 issues a store command to active keeper nodes. In one example embodiment and based on the local list of keeper nodes and the global list of active nodes known to the node 110 (as described with reference to the processes S416 and S421 of FIG. 4), the processor 250 issues a store command to nodes having a node ID in the local list of keeper nodes that are also active on the ECS 100. The store command, directs the receiving nodes to store a copy of the retrieved file.

At S709 and based on the local list of keeper nodes and the global list of active nodes, the processor 250 generates a list of missing nodes. In one example embodiment, the list of missing nodes include node IDs of the local list of keeper nodes that are absent from the global list of active nodes.

Thereafter, at S714, the processor 250 transmits the generated list of missing nodes to the anchor node (e.g., node 130). Based on the received list of missing nodes, the anchor node updates the global list of missing nodes as described above with reference to FIG. 3. Furthermore, at S714, the processor 250 transmits a copy of the retrieved file to the anchor node, which the anchor node receives and temporarily stores as described above with reference to FIG. 3. As described, as each missing node rejoins the ECS 100, the anchor node transmits a copy of the retrieved file to the rejoined missing node and after all missing nodes have rejoined and received a copy of the retrieved file, the anchor node deletes (or marks for deletion) the temporary copy of the retrieved file from the anchor node's local cache.

At S719, the processor 250 also informs the anchor node that the node 110 has retrieved the file and thus is the most recent retriever of the file. Based on the received indication from the node 110, the anchor node updates the list of most recent file retriever nodes at S315 of FIG. 3 so that the node ID of the node 110 is registered as the most recent retrieved for the retrieved file.

Figure 8:
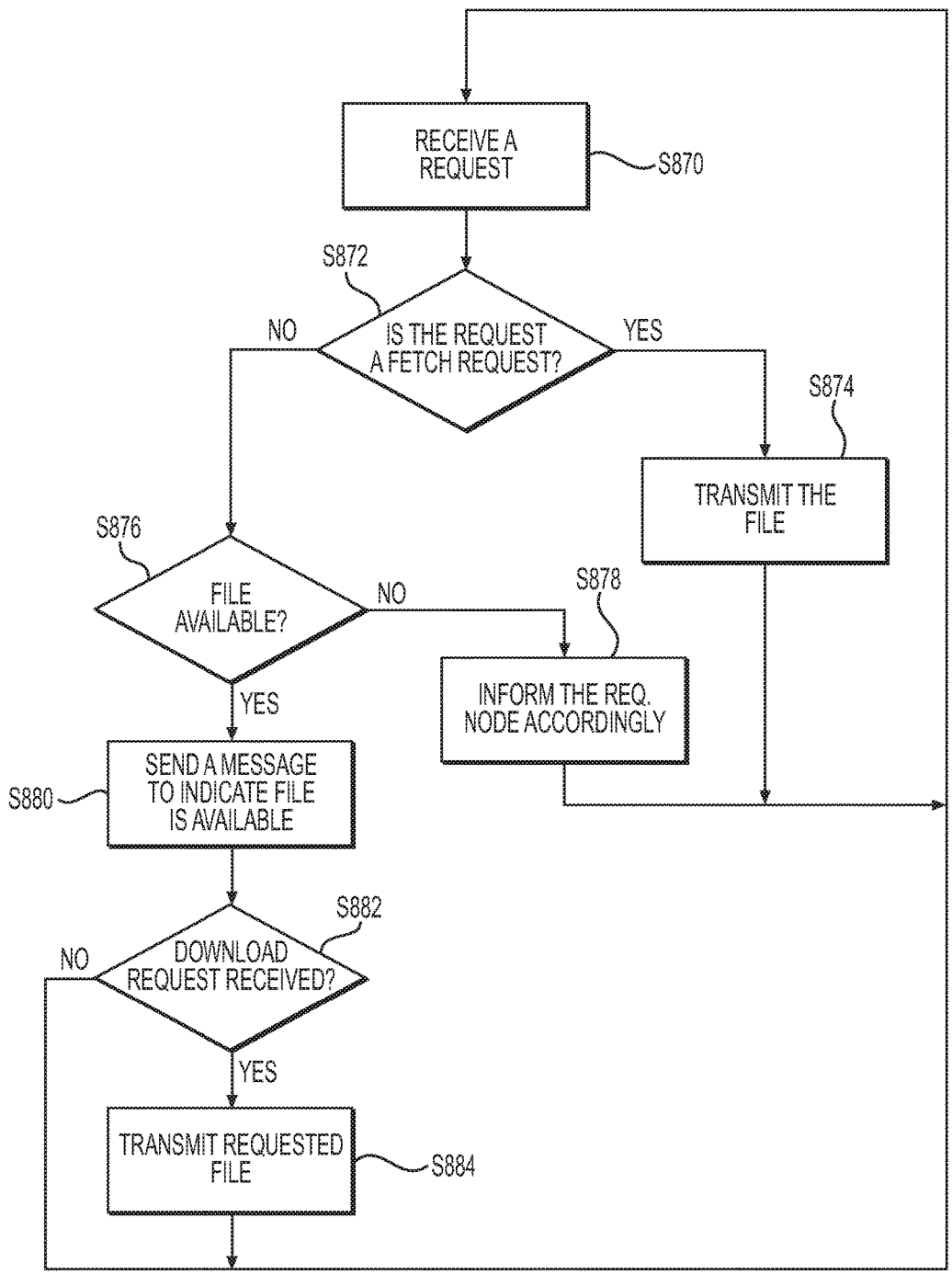
FIG. 8 illustrates a process of providing a file by a node of the ECS of FIG. 1, according to an example embodiment.

FIG. 8 illustrates a process of providing a file by a node of the ECS of FIG. 1, according to an example embodiment. FIG. 8 will be described with reference to FIGS. 1-3. FIG. 8 will be described from the perspective of the node 110, as a representative of the nodes of the ECS 100. More specifically, FIG. 8 will be described from the perspective of the processor 250 of the node 110 described above with reference to FIG. 2.

As described above, once a node such as the node 110 determines to retrieve a file from another node of the ECS 100, such node may do so by, for example, issuing a "fetch" request to the other node of the ECS 100. With regard to FIG. 8, it is assumed that the node 110 is now acting as a provider of a file to another node of the ECS 100 that requested the file (e.g., node 120).

At S870, the processor 250 receives a request from the node 120 regarding the availability of a file (cached) at the node 110.

At S872, the processor 250 determines whether the received request is a fetch request. If the processor 250 determines that the received request is a fetch request, the processor 250 at S874 initiates transmission of the requested file to the node 120. Thereafter, the process reverts back to S870 until the node 110 receives another retrieval request for a file stored at the node 110.

However, if at S872, the processor 250 determines that the received request is not a fetch request (e.g., the request is a query to determine the availability of the requested file at the node 110), then at S876, the processor 250 determines whether the requested file is available at the node 110. In one example embodiment, the processor 250 determines the availability of the requested file by checking the received key against the local list of key(s) of files stored (cached) at the node 110.

If at S876, the processor 250 determines that the requested file is not available at the node 110, then at S878, the processor 250 transmits a message to the node 120 informing the node 120 that the node 110 does not have the requested file. Thereafter, the process reverts back to S870 until the node 110 receives another retrieval request for a file stored at the node 110.

However, if at S876, the processor 250 determines that the requested file is available at the node 110, then at S880, the processor 250 transmits a message to the node 120 informing the node 120 that the node 110 has the requested file.

Thereafter, at S882, the processor 250 determines whether a download request is received from the node 120, within a time period T. The time period T may be a reconfigurable parameter determined based on experiments and/or empirical studies.

If at S882, the processor 250 determines that the download request has been received from the node 120 (within the time period T), then at S884, the processor 250 transmits the requested file to the node 110. Thereafter, the process reverts back to S870 until the node 110 receives another retrieval request for a file stored at the node 110.

However, if at S882 and within the time period T, the processor 250 does not receive the download request, then the process reverts back to S870 until the node 110 receives another retrieval request for a file stored at the node 110.

In one or more example embodiments, upon joining the ECS 100, a node such as the node 110 may initiate a process of leaving the ECS 100.

Figure 9:
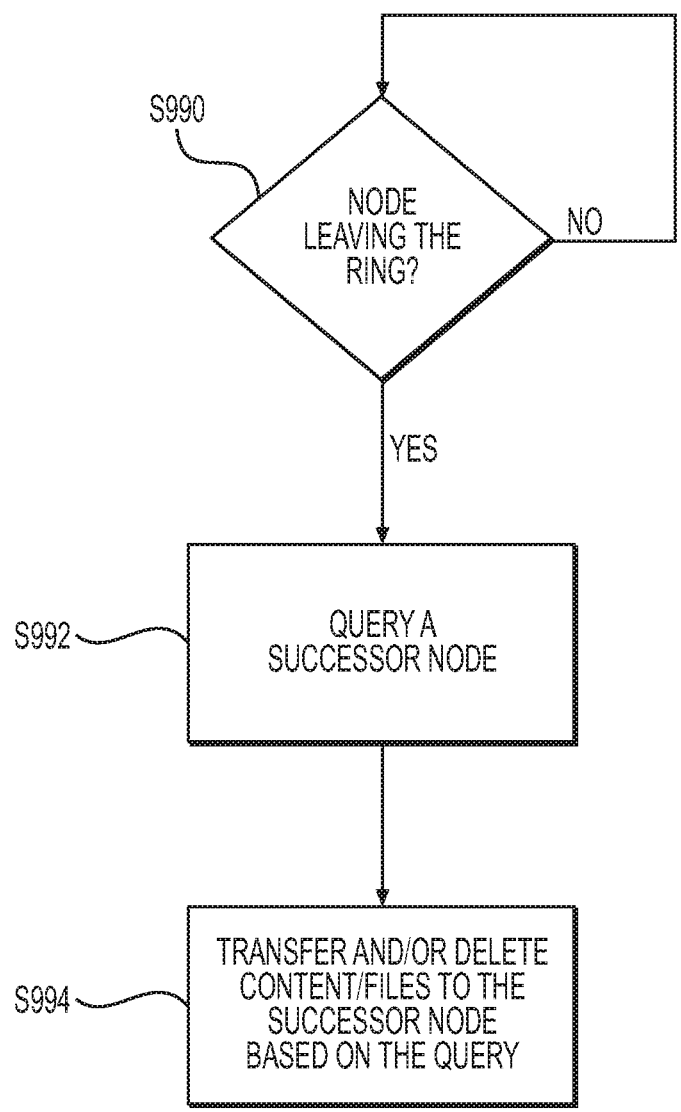
FIG. 9 illustrates a process of leaving the ECS by a node of the ECS of FIG. 1, according to an example embodiment.

FIG. 9 illustrates a process of leaving the ECS by a node of the ECS of FIG. 1, according to an example embodiment. FIG. 9 will be described with reference to FIGS. 1-3. FIG. 9 will be described from the perspective of the node 110, as a representative of the nodes of the ECS 100. More specifically, FIG. 9 will be described from the perspective of the processor 250 of the node 110 described above with reference to FIG. 2.

At S990, the processor 250 determines whether the node 110 is leaving the ECS 100. In one example embodiment, the processor 250 determines that the node 110 is leaving the ECS 100 if the processor 250 terminates the transmission of "keep alive" messages to an anchor node of the ECS 100. In one example embodiment and when the node 110 is configured as an anchor node of the ECS 100, the processor 250 determines that the node 110 is leaving the ECS by not acknowledging "keep alive" messages received from other nodes of the ECS 100, by transmitting message to other nodes of the ECS 100 indicating that the node 110 will no longer be part of the ECS 100 and/or upon receiving an indication from a user of the node 110 via the API of the node 110, as described above.

If at S990, the processor 250 determines that the node 110 is not leaving the ECS 100, the processor 250 performs S990 (e.g., periodically) to determine if the node 110 is leaving the ECS 100 or not.

However, if at S990, the processor 250 determines that the node 110 is leaving the ECS 100, then at S992, the processor 250 queries a successor node of the node 110 (e.g. node 115) to determine the amount of storage space available on the successor node.

At S994 and based on the amount of available storage space on the successor node, the processor 250 either deletes or transfers (transmits) files stored on the node 110 to the successor node prior to leaving the ECS 100. In one example embodiment, the stored files are related to the operation of the node 110 while being part of the ECS 100.

In one example embodiment, if the query at S992 indicates that the successor node has enough storage space available for all the files stored on the node 110, then the processor 250 initiates a transferring of all the stored files to the successor node at S994.

In one example embodiment, if the query at S992 indicates that the successor node does not have enough storage space available for all the files stored on the node 110, then at S994, the processor 250 may perform any of the following.

In one example embodiment, the processor 250 does not transfer any files to the successor node once the processor 250 determines that the successor node does not have enough storage space.

In one example embodiment, the processor 250 transfers, starting from the most recently accessed or used portions of the stored files, only a portion of the stored files which the successor node is capable of accepting and storing.

In one example embodiment, each node in the ECS 100 keeps a most-recent-access-time stamp for each file stored on the node when the file is most recently accessed. Accordingly, the processor 250 determines which of the files stored on the node 110 constitute the most recently accessed or used portions of the stored files, by accessing the most-recent-access-time stamp associated with each stored file.

In one example embodiment, the processor 250 obtains a list of files stored on the successor node and arranges both the files stored on the successor node as well as the files stored on the node 110 in a chronological order, starting from the most recent accessed or used files. Thereafter, the processor 250 transfers the files, starting from the most recently accessed or used of the rearranged files (based on corresponding most-recent-access-time stamps described above), to the successor node until the successor node no longer has storage space available for accepting additional files. Accordingly, in this example embodiment, not only the less recently accessed or used filed stored on the node 110 will be deleted and not transferred to the successor node, one or more less recently accessed or used files of the successor node will also be deleted in order for the successor node to store more recently accessed or used files thereon.

In one example embodiment, if the query at S992 indicates that the successor node does not have any storage space available for storing the files of the node 110, then at S922 the processor 250 simply deletes the files stored on the node 110 prior to leaving the ECS 100. Thereafter, the process ends.

Example embodiments above have been described for a general setting of an ECS in which there is an "n" number of nodes therein n is an integer equal to or greater than 2) and "k" keeper nodes (wherein k is an is the duplication factor described above, which is an integer equal to or greater than 2).

An example of the above general setting is when the ECS 100 has 2 nodes and the duplication factor is equal 2. More specifically, assuming that the ECS 100 has nodes 110 and 115 only (nodes 110 and 115 are both active nodes on the ECS 100) and that the duplication factor is 2, then the process will be simplified as follows.

Upon node 110 requesting a file and generating a key for the file, the node 110 first checks with the node 115 to determine the availability of the requested file. If the file is not available at the node 115, then the node 110 retrieves a copy of the file from the remote server 140. Upon retrieving the file, the node 110 transmits a store command to the node 115 for the node 115 to store a copy of the retrieved file thereon.

In example embodiments, devices are considered as either a node of the ECS 100 or not. As an alternative, a device may join the ECS 100 as a guest node and may benefit from/use the files already available on the nodes of the ECS 100. Such guest node may join the ECS 100 via one of the existing nodes of the ECS 100 acting as a proxy node for the guest node. Accordingly and from the perspective of other nodes of the ECS 100, the proxy node will perform file retrieval and providing on behalf of the guest node.

In example embodiments described above, WiFi is used as an example of a LAN/WLAN over which the ECS 100 and/or the remote sub ring are formed. However, example embodiments are not limited to WiFi. For example, the nodes can form the ECS 100 using their corresponding Bluetooth interface instead of their WiFi interface.

In example embodiments described above LAN/WLAN is used as a particular type of network over which the ECS 100 or the remote sub ring is formed. However, example embodiments are not limited thereto and any other peer-to-peer technology capable of connecting individual devices without using a service provider network may be used.

Variations of the example embodiments are not to be regarded as a departure from the spirit and scope of the example embodiments, and all such variations as would be apparent to one skilled in the art are intended to be included within the scope of this disclosure.

What is claimed:

1. A device comprising:
    a memory having computer-readable instructions stored therein; and
    a processor configured to execute the computer-readable instructions to, configure a device as a node in a cloud storage structure formed over a local area network,
    generating a unique node identification (ID) for the device,
    designating the device as one selected from a group of a primary anchor node, a secondary anchor node, and a regular node of the cloud storage structure, the primary anchor node being configured to maintain at least one of a global list of active nodes on the cloud storage structure, a global list of missing nodes from the cloud storage structure, a list of most recent file retriever nodes and a temporary copy of at least one retrieved file, the secondary anchor node being configured to serve as a temporary anchor node for the cloud storage structure when the primary anchor node is unavailable, the list of most recent file retriever nodes identifying nodes of the cloud storage structure that most recently retrieved a copy of at least one file, and
    exchange a file available on the cloud storage structure without obtaining the file from a remote server outside of the cloud storage structure.

2. The device of claim 1, wherein if the device is configured as the primary anchor node, the processor is configured to execute the computer-readable instructions to,
    receive at least one keep alive message from at least one regular node of the cloud storage structure, and
    generate the global list of active nodes based on the received at least one keep alive message.

3. The device of claim 2, wherein the processor is configured to execute the computer-readable instructions to generate the keep alive message based on at least one of a user input, a detection of a dynamic host configuration request of the device, an expiration of a timer configured by the user and a system default value.

4. The device of claim 1, wherein if the device is configured as the regular node, the processor is configured to execute the computer-readable instructions to,
    generate a keep alive message,
    transmit the keep alive message to an anchor node,
    determine if the device is configured as a secondary anchor node,
    upon determining that the device is configured as the secondary anchor node and receiving an indication that the device is to serve as the temporary anchor node, operate the device as the temporary anchor node of the cloud storage structure until the processor receives an indication to terminate the operation of the device as the temporary anchor node of the cloud storage structure.

5. The device of claim 1, wherein if the device is configured as a regular node, the processor is configured to execute the computer-readable instructions to exchange the file by,
    generating a key for the file,
    determining if the file is available at one of a local cache at the device and at least one other node of the cloud storage structure,
    retrieving the file from one of the local cache at the device and the at least one other node of the cloud storage structure upon determining that the file is available at one of the local cache of the device and the at least one other node of the cloud storage structure, and
    retrieving the file from the remote server upon determining that the file is not available at one of the local cache of the device and the at least one other node of the cloud storage structure.

6. The device of claim 5, wherein the processor is configured to retrieve the file from the local cache at the device if the generated key matches a key in a local list of keys stored at the device.

7. The device of claim 6, wherein the processor is configured to retrieve the file from one of the at least one other node of the cloud storage structure and the remote server if the processor determines that the generated key does not match a key in the local list of keys stored at the device.

8. The device of claim 6, wherein the processor is configured to,
    generate a local list of keeper nodes for the file based on the generated key and a duplication factor, the local list of keeper nodes including a node ID of at least one node of the cloud storage structure at which a copy of the file should be available, the duplication factor determining a number of nodes at which a copy of the file should be available,
    receive the global list of active nodes of the cloud storage structure from an anchor node of the cloud storage structure,
    determine if at least one node ID in the local list of keeper nodes matches a node ID in the global list of active nodes, and
    retrieve the file from at least one other regular node of the cloud storage structure if the processor determines that there is a match between the at least one node ID in the local list of keeper nodes and the node ID in the global list of active nodes, the at least one other regular having anode ID corresponding to the at least one node ID.

9. The device of claim 8, wherein the processor is configured to execute the computer-readable instructions to retrieve the file from the at least one other regular node of the cloud storage structure if the at least one other node of the cloud storage structure has the copy of the file.

10. The device of claim 9, wherein the processor is configured to execute the computer-readable instructions to retrieve the file from the remote server if the copy of the file is not available at the anchor node or the most recent retriever of the file.

11. The device of claim 8, wherein if the processor determines that there is no match between any node ID in the local list of keeper nodes and the global list of active nodes of the cloud storage structure, the processor is configured to execute the computer-readable instructions to retrieve the file from at least one of the anchor node, a most recent retriever of the file known to the anchor node based on the list of most recent file retriever nodes, and the remote server.

12. The device of claim 11, wherein upon retrieving the file from the remote server, the processor is configured to execute the computer readable instructions to,
  issue a store command for storing the retrieved file to every node having a node ID in the local list of keeper nodes and the global list of active nodes,
  generate a list of missing nodes, the list of missing nodes including a node ID of every node in the local list of keeper nodes that is not included in the global list of active nodes, and
  send the generated list of missing nodes and a copy of the retrieved file to the anchor node, the anchor node providing a copy of the retrieved node to every missing node upon each missing node returning to the cloud storage structure.

13. The device of claim 12, wherein the processor is configured to execute the computer-readable instructions to,
  retrieve the file locally from the local cache of the anchor node if the file is available at the local cache of the anchor node,
  if the file is not available at the cache of the anchor node, determine if the file is available at another regular node of the cloud storage structure based on a local list of keeper and the global list of active nodes,
  determine if the key matches a key stored in the list of most recent file retriever nodes, if the processor determines that the file is not available at any other regular node, and
  retrieve a copy of the file from a most recent retriever node of the file if the key matches the key stored in association with a node ID of the most recent retriever node in the list of most recent file retriever nodes.

14. The device of claim 1, wherein if the device is configured as the primary anchor node, the processor is configured to execute the computer-readable instructions to exchange the file by,
  generating a key for the file, and
  determining if the file is available at one of a local cache at the anchor node and at least one other node of the cloud storage structure,
  retrieving the file from one of the local cache at the anchor node and the at least one other node of the cloud storage structure upon determining that the file is available at one of the local cache of the anchor node and the at least one other node of the cloud storage structure, and
  retrieving the file from the remote server upon determining that the file is not available at one of the local cache of the anchor node and the at least one other node of the cloud storage structure.

15. The device of claim 14, wherein the processor is configured to execute the computer-readable instructions to,
  generate a key for the file,
  generate a list of active nodes of the cloud storage structure available over the other local area network,
  generate a local list of keeper nodes for the file based on the generated key and a duplication factor, the local list of keepers including node ID of at least one node of the cloud storage structure at which a copy of the file should be available, the duplication factor determining a number of nodes at which a copy of the file should be available,
  determine if at least one node ID in the local list of keeper nodes matches a node ID in the list of active nodes,
  retrieve the file from one of a remote server and another active node over the other local area network based on the generated list of active nodes and the generated local list of keepers, and
  update an anchor node of the cloud storage structure with information corresponding to the retrieved file upon returning to the cloud storage structure.

16. The device of claim 1, wherein
  the device moves outside of a coverage area of the local area network upon being configured as the node in the cloud storage structure, and
  the device is configured to establish a network connection via another local area network.

17. The device of claim 1, wherein the processor is configured to execute the computer-readable instructions to exchange the file by,
  receiving an inquiry for availability of the file from another node of the cloud storage structure, and
  providing the requested file to the other node of the cloud storage structure if the device has the requested file stored thereon and the other node of the cloud storage structure transmits a fetch request to the device for receiving the file.

18. The device of claim 1, wherein prior to leaving the cloud storage structure, the processor is configured to execute the computer-readable instructions to transfer files stored on the device, to a successor node of the device in the cloud storage structure based on a storage capacity of the successor node.

19. The device of claim 18, wherein prior to transferring the stored files to the successor node, the processor is configured to execute the computer-readable instructions to,
  query the successor node to determine an amount of free storage space available on the successor node, and
  transfer only the most recently used portion of the stored files for storage on the successor node, if the amount of free storage available on the successor node is less than a size of stored information on the device.

* * * * *